United States Patent
Clemo et al.

(10) Patent No.: US 8,755,200 B2
(45) Date of Patent: Jun. 17, 2014

(54) SINGLE STAGE POWER CONVERSION UNIT WITH CIRCUIT TO SMOOTH AND HOLDUP DC OUTPUT VOLTAGE

(71) Applicant: International Business Machines Corporation, Armonk, NY (US)

(72) Inventors: Raymond M. Clemo, Raleigh, NC (US); Jamaica L. Barnette, Durham, NC (US); Alfred L. Burress, Raleigh, NC (US); Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/899,669

(22) Filed: May 22, 2013

(65) Prior Publication Data

US 2013/0250632 A1    Sep. 26, 2013

Related U.S. Application Data

(62) Division of application No. 12/568,505, filed on Sep. 28, 2009, now Pat. No. 8,472,211.

(51) Int. Cl.
*H02M 3/335* (2006.01)

(52) U.S. Cl.
USPC ..................... 363/21.06; 363/21.01

(58) Field of Classification Search
CPC ................. H02M 1/143; H02M 1/15
USPC .............. 363/20, 21.01, 21.06, 21.14, 95, 97
See application file for complete search history.

(56) References Cited

U.S. PATENT DOCUMENTS

| | | | |
|---|---|---|---|
| 5,237,492 A | 8/1993 | King | |
| 5,327,333 A | 7/1994 | Bolan et al. | |
| 5,757,626 A | 5/1998 | Jovanovic et al. | |
| 5,781,429 A * | 7/1998 | Tomimatsu et al. | 363/112 |
| 6,201,713 B1 * | 3/2001 | Hosotani | 363/19 |
| 6,396,717 B2 | 5/2002 | Yasumura | |
| 6,650,554 B2 | 11/2003 | Darshan | |
| 7,525,822 B2 * | 4/2009 | Aso et al. | 363/21.06 |
| 7,719,862 B2 | 5/2010 | Wrathall | |
| 7,773,398 B2 * | 8/2010 | Kyono | 363/127 |
| 7,781,982 B2 | 8/2010 | Tatsumi | |
| 7,859,860 B2 * | 12/2010 | Chen et al. | 363/16 |
| 7,859,865 B2 | 12/2010 | Baurle et al. | |
| 2008/0144339 A1 * | 6/2008 | Hsieh et al. | 363/21.02 |

OTHER PUBLICATIONS

Keith Szolusha, Lower dc/dc-converter ripple by using optimum capacitor hookup, EDN Oct. 31, 2002, pp. 104-106.
Chun-Feng Jin, Line Harmonics and Output-Ripple Reduction by a Novel Single Stage AC-DC Converter, IEEE Xplore, p. 111 and Abstract, Jun. 2009.

* cited by examiner

*Primary Examiner* — Matthew Nguyen
(74) *Attorney, Agent, or Firm* — Joscelyn Cockburn

(57) ABSTRACT

A circuit arrangement includes a transformer, having primary windings and secondary windings, and a high voltage capacitor. A first switching circuit couples the high voltage capacitor to the primary windings. A first controller is operatively coupled to the switching circuit. A second switching circuit couples the secondary windings to an output port. A second controller is operatively coupled to the secondary windings. A high voltage generator is provided to charge the high voltage capacitor.

20 Claims, 6 Drawing Sheets

SINGLE STAGE POWER CONVERSION UNIT WITH CIRCUIT TO SMOOTH AND HOLDUP DC OUTPUT VOLTAGE

CROSS-REFERENCE TO RELATED APPLICATIONS

This application is a divisional of U.S. patent application Ser. No. 12/568,505 filed Sep. 28, 2009.

BACKGROUND OF THE INVENTION

1. Field of the Invention

The present invention relates to voltage converters, in general, and in particular to converters that provide DC voltages to digital devices.

2. Description of the Related Art

The majority of electrical devices, especially digital ones, require DC voltages for proper operation. As these devices become more sophisticated both in functions and operation more demands are placed on power supplies or power rectifiers (hereafter called Power Conversion Units (or PCUs) to provide a more controlled DC voltage. Among the demands are the requirements that the DC voltage contains acceptable ripple and be available for a predefined time interval (hereafter termed holdup).

The current state of the art uses a PCU to convert service AC voltage to either a distributed DC output voltage or server component level DC voltage. The PCUs can be broadly classified into two groups. The groupings are based upon the topology of the PCUs. The PCUs in the first group are designed with a two stage topology. Even though the two stage PCUs work well for intended purposes they have drawbacks. In particular, the efficiency of the two stage PCUs is believed to be lower than what the electrical industry would like to have. The efficiency of such PCUs is a multiplication of the efficiency of the two stages. For example, if both stages were 95% efficient, the efficiency of a PCU in this group would be 90%. This level of efficiency is well below what is expected from a well designed PCU. The PCUs in the second group are designed with a single stage topology which is believed to be more efficient than the two stage topology. But even with the improved efficiency, the single stage PCUs have drawbacks too. One of the drawbacks is that the single stage PCUs generate higher, than acceptable, output ripple voltages. This higher output ripple voltage is unacceptable in many applications. As a consequence, the single stage topology would not be suitable for these applications. Another drawback is that some single stage topology PCUs are unable to holdup their output voltage for a predefined time interval. This is unacceptable because many power supply users require that the PCU holds the output DC voltage for a predefined time interval, usually between 10 and 20 milliseconds. Again the single stage topology is not suited for these applications.

Still another drawback is that the frequency response of a single stage converter is often insufficient for the load, causing large dips and overshoots in the output voltage due to dynamic change in the load.

In view of the above, there is a need for a PCU that is free from the shortcomings set forth above. Such a PCU is also needed to provide service to the applications that could not use a PCU with a single stage topology.

SUMMARY OF THE INVENTION

In accordance with the present invention, there is provided an improved PCU comprising one or more single stage rectifier circuit, also termed single stage converter circuit, and a ripple voltage smoothing and holdup circuit (also termed circuit arrangement) operatively coupled between the input port and output port of said PCU. The smoothing and holdup circuit monitors rectified current, rectified voltage levels at the input of said single stage rectifier, and DC voltage levels at its output. Depending on the quality of the monitored signals, the smoothing and holdup circuit generates fill in voltage energy that smooths DC ripple voltages at the output of said single stage rectifier. In addition, the smoothing and holdup circuit maintains the DC output voltage at a predefined voltage level for a predefined time interval.

The single stage rectifier circuit includes a diode bridge that generates rectified voltages from an AC source. The rectified voltages are applied to the primary winding of a transformer whose secondary windings delivers current through a diode to a capacitor which provides a DC output voltage, A switching device (preferably a Field Effect Transistor, FET) is driven by a controller to switch on and off at approximately 80 KHZ. As a consequence, energy is stored in the transformer and is transferred as a current to charge the output capacitor. The controller monitors rectified input current, rectified input voltage, and DC output voltage at the output capacitor. These inputs and a reference voltage, Vref1, are differentially compared and multiplied in a way that produce an error voltage which is the Output of U2. The output of U2 is compared with a saw tooth voltage signal to provide a third result that drives the switching device.

The circuit arrangement that smooths ripples and holdup DC output voltage includes a high voltage storage device (preferably a capacitor) which is charged by a high voltage generator. A pair of transistor from a two switch converter circuit is switched on and off at a rapid pace. As a consequence, the high voltage on the high voltage storage device is transferred to the primary winding of a transformer. A second pair of transistors from another two switch converter circuit couples the secondary windings of the transformer and transfers energy stored in said secondary windings through a coil to the capacitor providing the DC output voltage. Each pair of the two switch converter circuit is driven by a different control circuit. The details of each of the control circuit (hereafter termed Controller) are discussed herein after. In addition, several alternate embodiments for the high voltage generator are, also, discussed below.

Other features, benefits, and advantages of the present invention will be or become apparent for one with skill in the art upon examination of the following drawings and detailed description.

DETAILED DESCRIPTION OF AN EMBODIMENT

Figure 1:
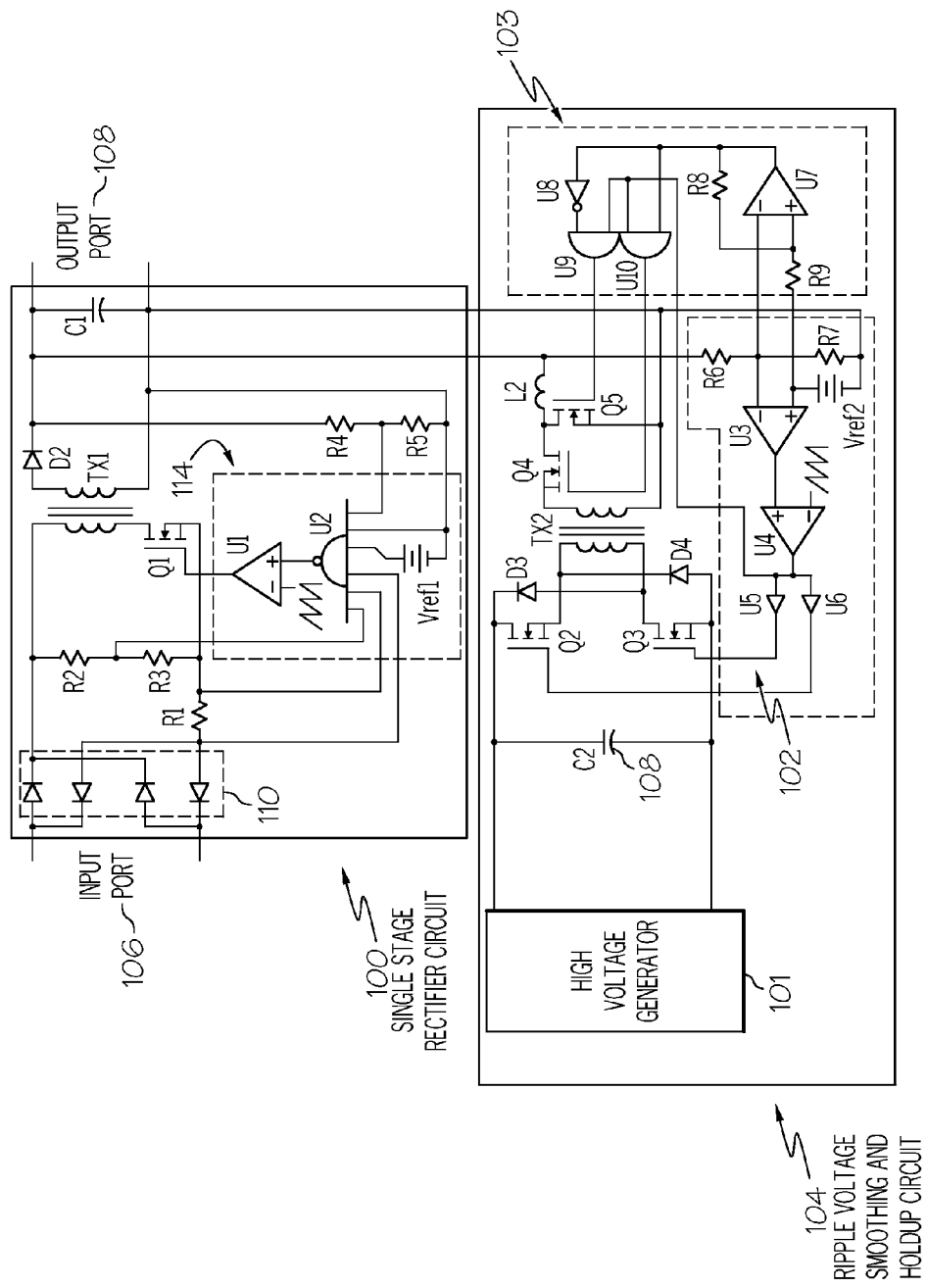
FIG. 1 shows one embodiment of a circuit diagram or circuit schematic of the Power Conversion Unit according to teachings of the present invention.

FIG. 1 depicts a circuit schematic of an embodiment of the PCU according to teachings of the invention. The PCU includes a single stage rectifier circuit 100, having an input port 106 and an output port 108. A Ripple Voltage Smoothing and Holding Circuit 104 (hereafter termed Circuit Arrangement) has its output operatively coupled to the capacitor C1 at output port 108. As will be described in greater details below, the Circuit Arrangement smooths and holdup the DC output voltage at output port 108 for a predefined time interval.

Still referring to FIG. 1, the single stage rectifier circuit 100 includes bridge rectifier circuit 110 having an input connected to Input Port 106 and an output connected to resistor R1, a Voltage Divider Circuit R2R3, the Primary Windings of a Transformer TX1, and a terminal of a switching device Q1. The secondary windings of Transformer TX1 are coupled to a storage device C1 through diode D2. A Voltage Divider Circuit R4R5 is connected to the Secondary Windings of the Transformer TX1 and Controller 114 whose output is connected to a second terminal of switching device Q1. The Controller 114 receives, at its input, voltage from reference voltage source Vref1, voltage generated by R2R3 Voltage Divider, current provided by R1, voltage provided by R4R5, and a saw-tooth voltage provided by a saw-tooth voltage generator (not shown). The way in which signals from the named entities are processed by the controller is described below. The Controller 114 includes circuits U2 that differentially compares the voltage generated by R4R5, the Reference Voltage Vref1, the current signal from R1, and voltage signal from R2R3. The signal generated by U2 is compared with a sine-saw tooth voltage signal in U1 whose output drives the switching device Q1. In one embodiment of the invention Q1 includes a power FET, Storage Device C1 includes a Capacitor, and the Bridge Rectifier Circuit 110 includes two pairs of diodes with each pair wired in a forward/blocking configuration.

In operation, the Single Stage Rectifier 100 receives AC signals at the Input Port 106 from an AC source (not shown). The bridge rectifier 110 rectifies the AC signals. Using pulse width modulation, Q1 is switched on and off at around 80 KHz, alternately storing energy in TX1 and allowing it to be discharged through diode D2 and onto the output capacitor C1. The controller 114 looks at input current measured across R1, input voltage from the R2, R3 resistor divider circuit and secondary output voltage from the R4, R5 resistor divider circuit. These inputs, and a reference voltage, Vref1, are differentially compared and multiplied in a way that produces an error voltage which is the output of U2. The output of U2 is compared against a sawtooth wave by U1 whose output controls the switching of Q1 The single stage control loop (also referred to as Controller 114) usually has relatively low gain and frequency response in order to provide good power factor correction. As a consequence, input frequency rejection ratio, regulation and dynamic response of the output voltage on C1 suffers. However, these undesirable characteristics are remedied by the addition of circuit arrangement 104 discussed hereinafter. It suffices to say at this point, that the circuit arrangement provides a relatively high voltage which is switched into C1 located at the Output Port 108. It should also be noted that the single stage rectifier of FIG. 1 accepts a single phase or phase to phase AC input. But multiphase designs are, also, available, and the present invention works equally well with them as it does with the single phase design.

Figure 6:
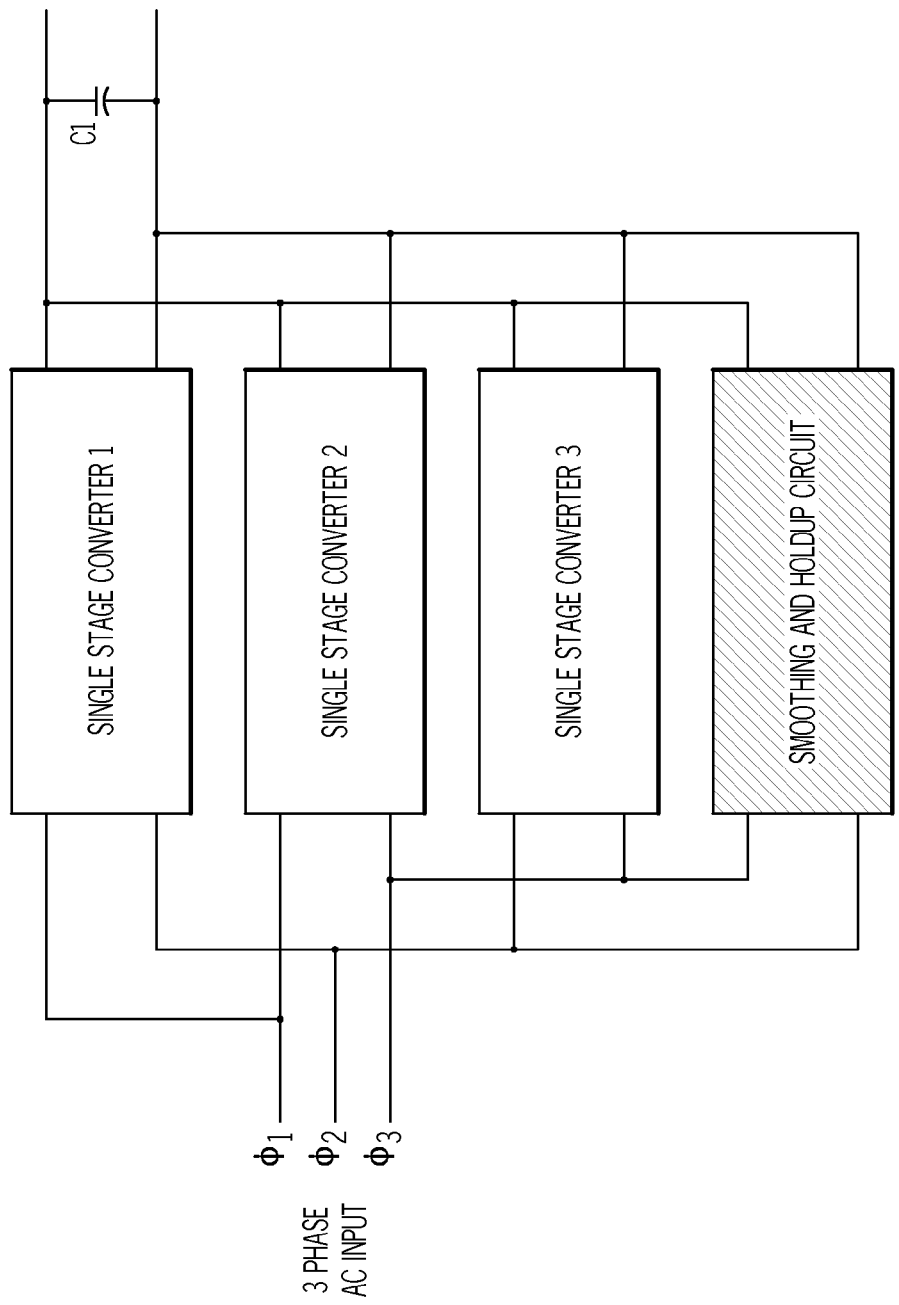
FIG. 6 depicts another embodiment of the PCU according to teachings of the present invention.

FIG. 6 shows a circuit diagram of a PCU for use with a three phase AC power supply. In this embodiment of the invention, multiple single stage converters labeled Single Stage Converter 1, Single Stage Converter 2, Single Stage Converter 3, and Smoothing and Holdup Circuit are connected at their outputs to capacitor C1. Likewise, the named entities are connected at their inputs to a three phase AC power source (not shown). The output phases from the AC power source are labeled theta 1, theta 2, and theta 3. For brevity the phases are shown by conventional symbols on FIG. 6. The circuitry for each of the stage and the Smoothing Circuit are substantially like the similar named entities described above and incorporated herein by reference. In operation, Single Stage Converter 1 receives power from phases theta 1 and theta 2. Single Stage Converter 2 receives power from phases theta 1 and theta 3. Single Stage Converter 3 receives power from phases theta 2 and theta 3. The input voltage to Single Stage Converter 2 is shifted 120 degrees with respect to the input voltage to Single Stage Converter 1 and the input voltage to Single Stage Converter 3 is shifted 240 degrees with respect to the input voltage to Single Stage Converter 1. All of the three phases are active. The smoothing circuit is only active when the voltage on C1 falls below the threshold voltage. This is the same as when there is only one stage.

Figure 2A:
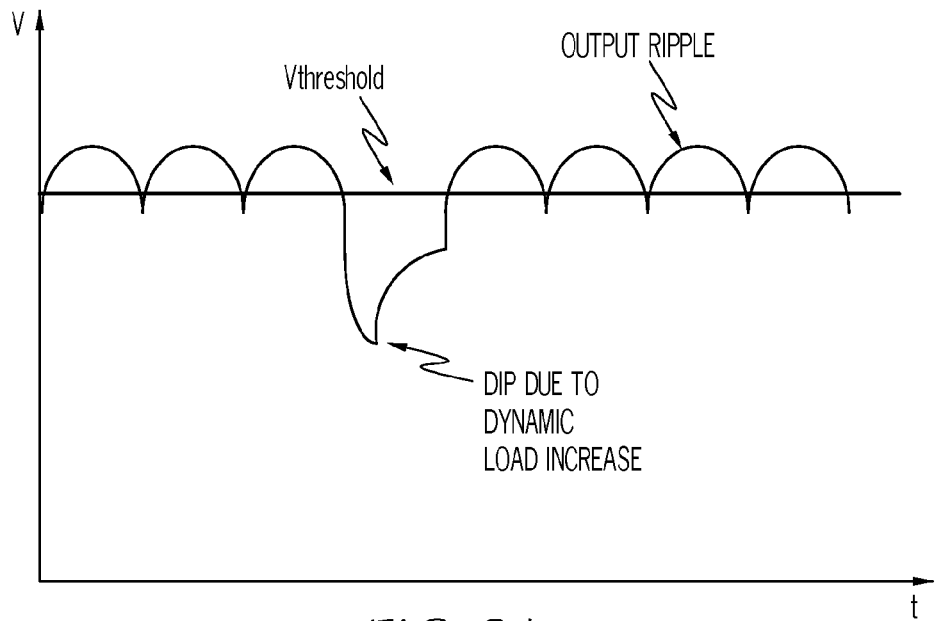
FIG. 2a shows a graphical representation of the ripple voltage at the output of the single stage rectifier circuit, excluding the effect of the circuit arrangement that produces smoothing and holdup of the DC output voltage.

FIG. 2*a* shows a graphical representation of voltage signals generated by the single stage rectifier circuit without the aid of the circuit arrangement 104(FIG. 1). The signals include a DC threshold voltage (labeled Vthreshold) and ripple voltages. Periodically, the ripples will fall below the threshold voltage. In addition, the fall below the DC threshold voltage is exacerbated due to variation in the load that the circuit drives. The drop is shown and labeled "Dip due to Dynamic Load increase". Most applications require the output voltage ripple to be above the threshold. As a consequence, the single stage rectifier circuit alone is not suitable for these applications.

Figure 2B:
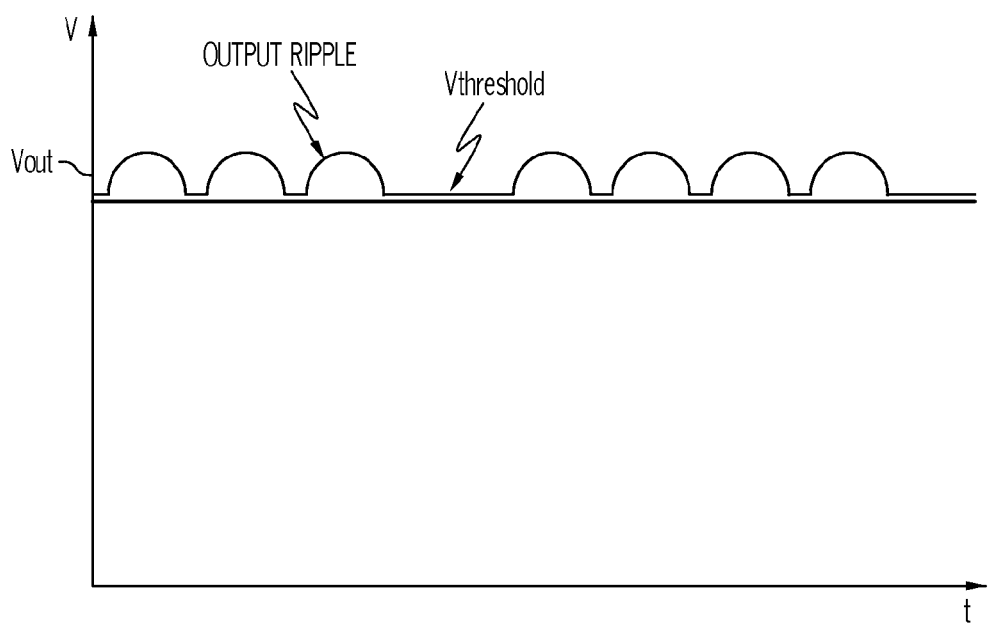
FIG. 2b depicts a graphical representation of the smooth output voltage generated by the PCU, including the single stage rectifier circuit and the circuit arrangement that produces the smoothing and holdup functions.

FIG. 2*b* shows a graphical representation of the voltage signals generated by the single stage rectifier and the circuit arrangement 104 (FIG. 1). A comparison of FIG. 2*a* and FIG. 2*b* indicates the ripple voltages of FIG. 2*b* are smaller than those of FIG. 2*a*. In addition, ripple voltages in FIG. 2*b* never fall below the threshold as they do in FIG. 2*a*. As a consequence, the problems exhibited in FIG. 2*a* are corrected by the PCU that generates the output shown in FIG. 2*b*.

Still referring to FIG. 1, circuit arrangement 104 which smooths and holdup the output voltage on capacitor C1 includes transformer TX2 having a primary windings and secondary windings. A pair of switching devices (preferably FETs) Q4 and Q5 interconnects the secondary windings to controller 103. An inductor L2 interconnects Q4 and Q5 to a first plate of capacitor C1. A feedback loop interconnects the second plate of C1 to Controller 102. As will be discussed in greater details below, components within Controller 103 are adjusted or set so that synchronous devices Q4 and Q5 (preferably FETs) are allowed to function when the output voltage at C1 reaches Vthreshold (FIG. 2*a*). A pair of synchronous switching devices (preferably FETs) Q2 and Q3 interconnects a high voltage storage device (preferably a capacitor C2) to the primary windings of transformer TX2. A diode D3 connects one end of the primary windings to Q2 and diode D4 connects a second end of said primary windings to Q3. The orientations of D3 and D4 relative to Q2, Q3, and the primary windings are such that when Q2 and Q3 are conducting current flows through the primary windings. As a result energy from the high voltage capacitor is dumped into the primary windings. Controller 102 switches Q2 and Q3 at a relative high rate to transfer energy from high voltage capacitor C2 through Q2, and Q3 to the primary windings of transformer TX2. A high voltage generator 101 charges capacitor 108 to a desired voltage level. It should be noted C2 stores a high voltage. Therefore, its value must be selected accordingly. A replacement figure for FIG. 1, labeling Q5 and deleting 112, is provided herewith.

Still referring to FIG. 1, Controller 102 includes a voltage divider circuit R6, R7, two series connected comparator circuits U3 and U4, and two driver circuits U5 and U6. The voltage divider circuit R6 and R7 minors the output voltage across C1 onto an input terminal of comparator U3. Another input terminal of U3 is connected to a reference voltage Vref2. The output signal from U3 is applied to an input terminal of comparator U4 and compare with a saw tooth voltage signal provided on another input terminal of U4. The output terminal of U4 is connected through drivers U5 and U6 to respective terminals of FETs Q3 and Q2. The function of the drivers is to enhance the power of signals output from U4 to the FETs Q2 and Q3, respectively.

Controller 103 generates control signals that drive FETs Q4 and Q5. The Controller includes a comparator U7 with an output connected through an inverter U8 to an input terminal of AND gate U9 and to an input terminal of AND gate U10. In addition, the output from U7 is fed back through R8 which acts in concert with R9 to reflect reference voltage Vref2 onto an input terminal of U7. Voltage Divider R6 and R7 reflect the voltage across capacitor C1 onto another terminal of comparator U7. The other input terminals of AND gate U9 and AND gate U10 are connected to the output terminal of comparator U4.

In operation, circuit arrangement 104 generates voltage signals that smooth the ripple voltages on capacitor C1 and generated by the single stage rectifier circuit and load dynamics. The bulk voltage on C2 is switched across the primary of transformer, TX2, using Q2 and Q3. The switching rate should be as high as practicable to increase loop response. Transformer, TX2, then transfers the switched voltage over to the secondary side according to the primary to secondary winding ratio. FETs Q5 and Q4 transfer the energy to the output filter, L2. The DC to DC feedback loop control circuit 102 uses voltage mode pulse width modulation to regulate the output voltage. The resistors (R6 and R7) values are adjusted such that when compared, using operational amplifier U3, against the reference voltage Vref2 the Vthreshold value shown in FIGS. 2a and 2b is set. The value is lower than the regulation point of the single stage section. The resulting output is then typically compared with a sawtooth waveform using comparator, U4. The output of U4 is then used to switch Q2 and Q3 using drivers U5 and U6. Since the gain and frequency response of the ripple voltage smoothing and holdup circuit is much better than that of the single stage such that when the output ripple voltage, or any voltage dip resulting from a dynamic load, goes below the Vthreshold level, the ripple voltage smoothing and holdup circuit responds, holding the output voltage up when the single stage section cannot.

The ripple voltage smoothing and holdup circuit must handle full load current, but, for short periods of time and thus components can be of lesser value from what they would be if they constantly providing output power. For three phase AC input, the threshold level can be adjusted so that it responds only to dynamic load changes or is needed for holdup time if one or more phases are lost.

Although not shown, the control circuit (102) can monitor AC input voltage, the voltage on capacitor, C1 or other information can be used, for the purpose of smoothing low frequency ripple voltage or holding the output voltage up with loss of AC. The circuitry of Controller 103 with comparator U7, R8, and R9 are adjusted so that the synchronous FETs Q4 and Q5 are allowed to function when the output voltage reaches Vthreshold.

Figure 3:
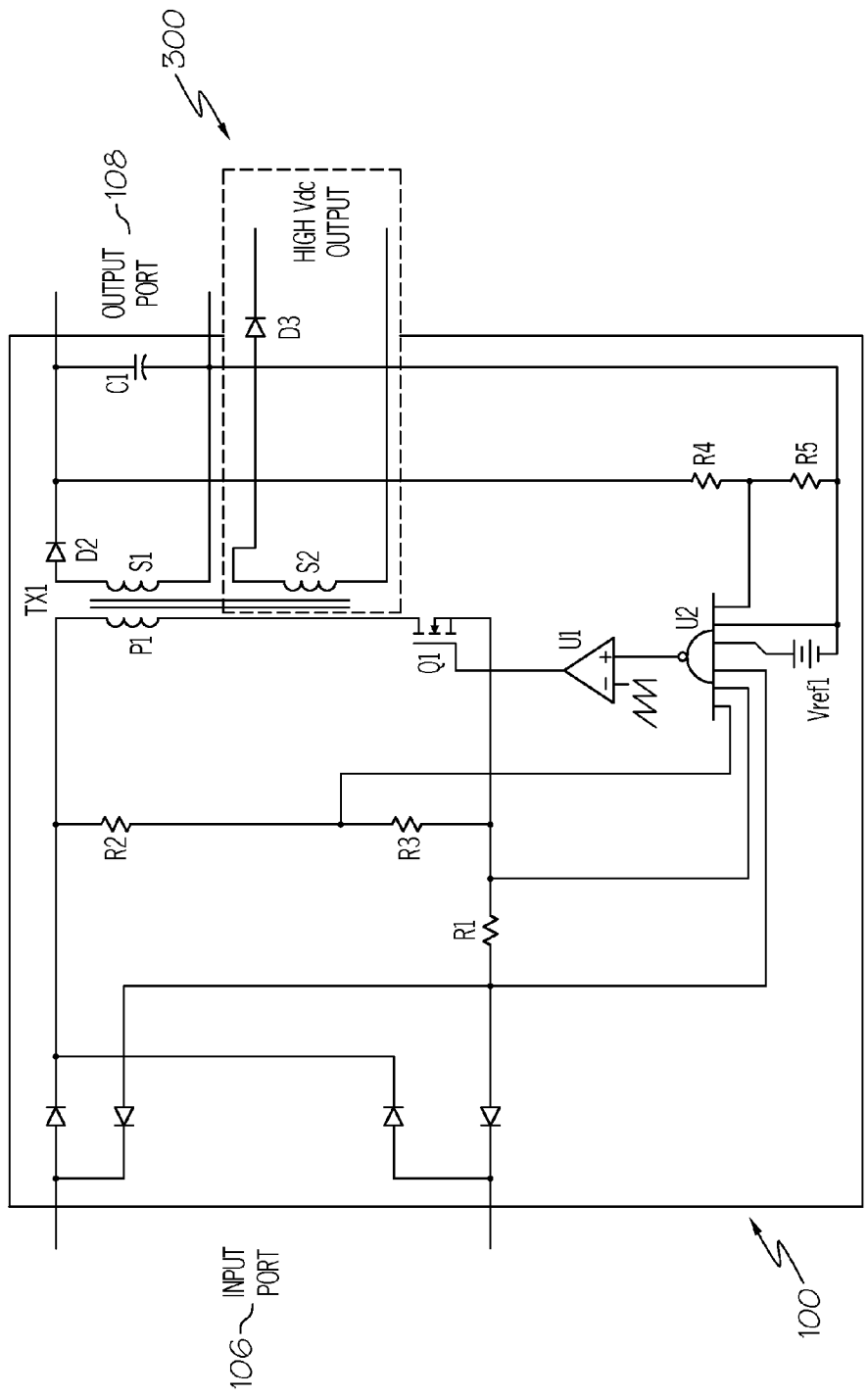
FIG. 3 depicts a first embodiment of a high voltage charging circuit.

FIG. 3 depicts an embodiment of a circuit for the high voltage generator that provides the high voltage that is stored on capacitor C2 (FIG. 1). Preferably, the voltage can be between 300 volts dc and 600 volts dc. These values are only examples and other values may be selected without departing from the spirit and scope of the present invention. The high voltage generating circuit 300 includes secondary windings S2 placed on transformer TX1 and diode D3 connected to windings S2. The circuit remaining in FIG. 3 is that of the Single Stage Rectifier Circuit discussed in detail above. The reproduction of the single stage rectifier circuit in FIG. 3 gives the reader a complete picture of the topology and show the relationship between the Single Stage Rectifier Circuit and the high voltage generating circuit 300. As a consequence, further discussion of the Single Stage Rectifier is not warranted.

Figure 4:
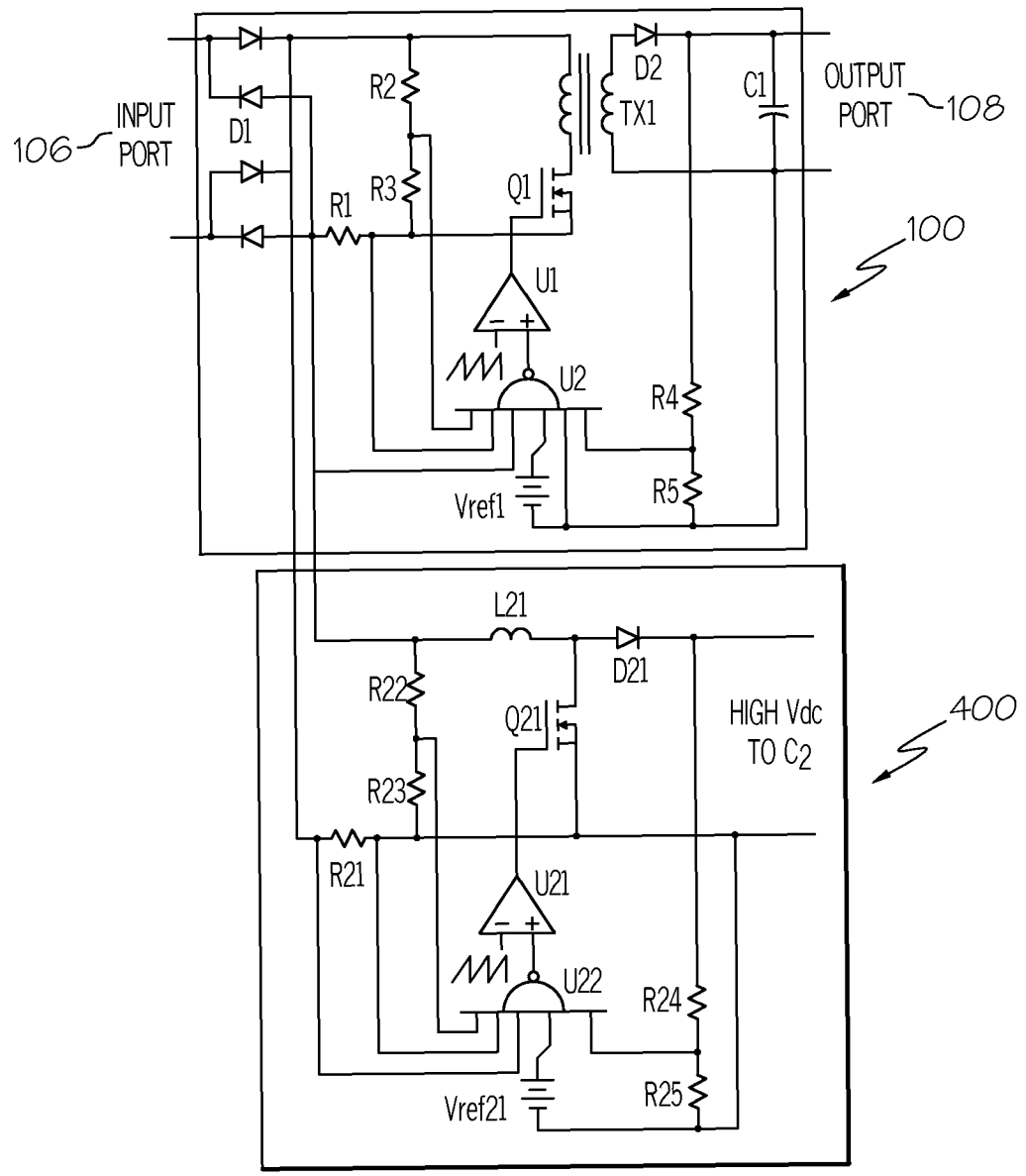
FIG. 4 depicts a second embodiment of the high voltage charging circuit.

FIG. 4 depicts an alternate embodiment of a high voltage generator 101 (FIG. 1) that generates the high voltage stored on capacitor C2. For continuity and association purposes, components and circuit assemblies previously described are identified with common numerical notations. The high voltage generating circuit 400 is shown in combination with Single Stage Rectifier Circuit 100, described above and will not be repeated. The high voltage generating circuit 400 uses a separate power factor corrected boost converter to create the high voltage Vdc stored on capacitor C2 (FIG. 1). The high voltage generating circuit 400 includes a power switching device (preferable a FET) Q21 with an output terminal connected to an inductor L21 and diode D21. Inductor L21 is connected to the diode bridge D1. A Controller U22 is connected to the gate electrode of Q21 and switches Q21 at a predefined rate to generate the high voltage delivered to capacitor C2 (FIG. 1). U22 of the controller includes circuits that use the voltage at diode D21 which is connected to C2 and delivered through voltage divider circuit R24 and R25, with voltage Vref1, the current sourced from R21, and the AC voltage provided by R22 and R23. These inputs are differentially compared and multiplied in a way that produces an error voltage which is the output of U22. The error voltage output of U22 is applied to an input terminal of comparator U21. The other input terminal of U21 is connected to a saw-tooth voltage signal. The output from U21 is the pulse width modulation that drives the switching device Q21.

Figure 5:
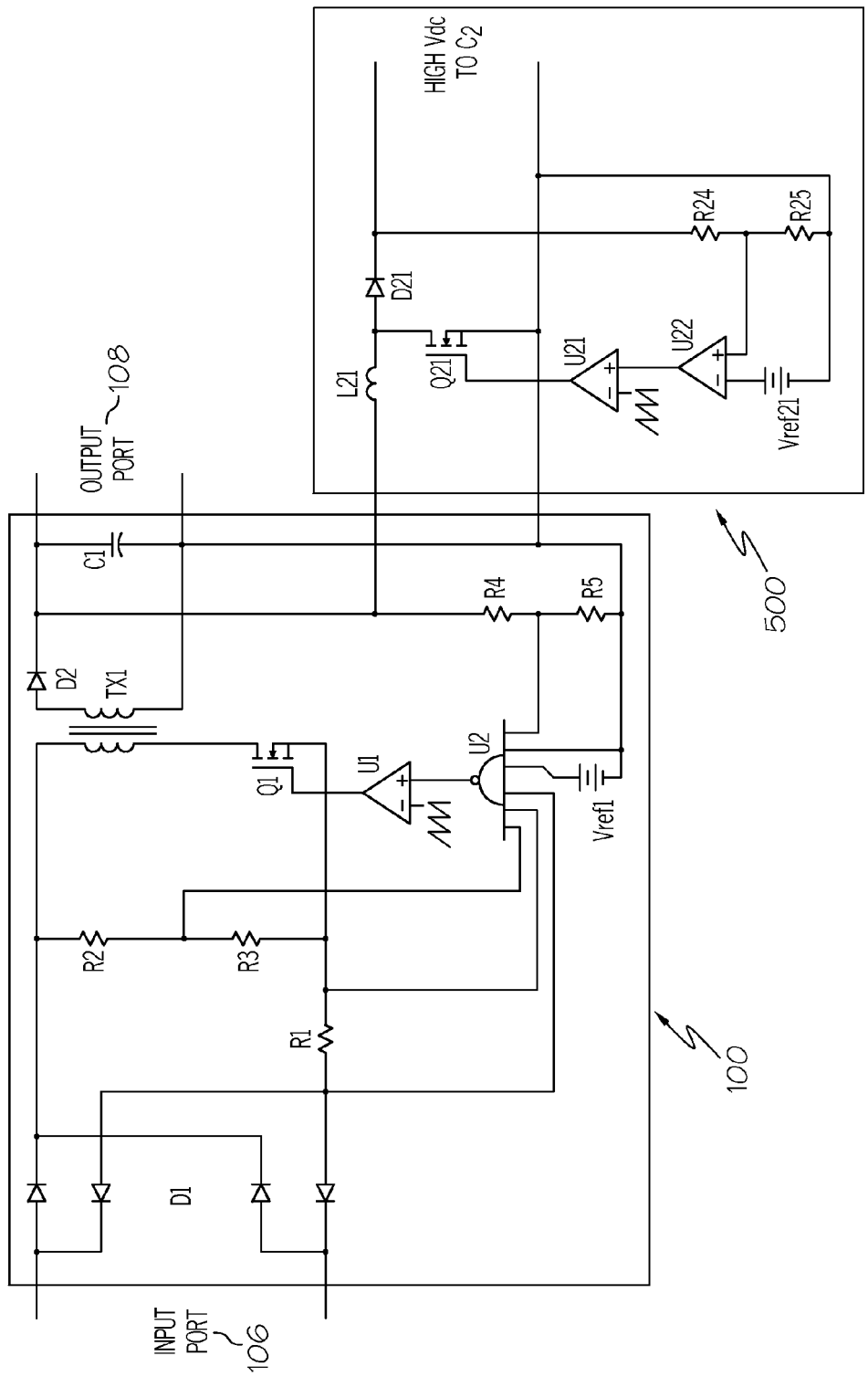
FIG. 5 depicts a third embodiment of the high voltage charging circuit.

FIG. 5 shows another alternate embodiment of a circuit for developing the high voltage that is delivered to capacitor C2 (FIG. 1). For simplicity and continuity purposes components and/or assemblies that are similar to previously described ones are identified by common numeric characters. The high voltage generating circuit 500 is shown in conjunction with Single Stage Rectifier 100 that has been discussed in details above and further discussion is not warranted. In this embodiment, energy from Low voltage Vdc output is boosted and is delivered to C2 for storage. In particular, high voltage generating circuit 500 includes power FET Q21 with an output terminal connected to inductor L21 and diode D21. Inductor L21 is connected to one of the plates of capacitor C1. The other plate of capacitor C1 is connected to a second electrode of Q21. The base electrode of FET Q 21 is connected to Controller U22 and U21. U22 receives on one of its inputs the high voltage Vdc, provided by voltage divider circuit R24 and R25, and compares it with a reference voltage Vref21 provided on a second input. The result of the comparison is compared with a saw-tooth voltage in U21. The signal output from U21 switch FET Q21 ON and OFF. As a result the low voltage Vdc provided by capacitor C1 is boosted to the high level voltage stored on capacitor C2 (FIG. 1).

This invention provides several benefits including a) improving input frequency rejection ratio, b) removing output voltage ripple, c) improving dynamic load response, and d) maintaining output voltage holdup time. This is accomplished by adding a high voltage DC capacitor on the primary side of the PCU and converting that DC voltage to the output DC Voltage to reduce low frequency ripple and provide holdup time. This topology, also, improves the overall dynamic response of the PCU.

While the invention has been described and particularly shown with reference to an embodiment, it will be understood by those with skill in the art that various changes in form and details may be made therein without departing from the spirit and scope of the invention. Any such changes are intended to be covered by the accompanying claims.

What is claimed is:

1. A circuit arrangement for smoothing ripple voltages in voltage signals generated by at least one AC to DC converter, said circuit arrangement comprising:
    a transformer having primary windings and secondary windings;
    a first synchronous two switch forward converter circuit operatively coupled to the primary windings;
    a second two switch forward converter circuit operatively coupled to the secondary windings;
    a high voltage storage device coupled to the primary windings;
    a high voltage generator connected to the high voltage storage device;
    a first single controller having one output terminal operatively coupled to control terminals of devices within the first synchronous two switch forward converter circuit, wherein said first single controller correlating predefined voltage signals to generate a first control signal to simultaneously drive said devices within the first synchronous two switch forward converter circuit; and
    a second controller having an output connected to the second two switch forward converter circuit, said second controller correlating predefined voltage signals to generate a second control signal to drive the second two switch forward converter circuit wherein output voltage signal from said secondary winding smooth voltage ripples in the voltage signal provide by said at least one AC to DC converter and holdup output voltage if said at least one AC to DC converter is unable to do so.

2. The circuit arrangement of claim 1 wherein each of the first synchronous two switch forward converter circuit and the second two switch forward converter circuit include a pair of FETs.

3. A circuit arrangement comprising:
    a transformer comprising primary windings and secondary windings;
    a high voltage storage device;
    a first synchronous two switch forward converter circuit operatively coupling the high voltage storage device to the primary windings;
    a first single controller having one output terminal operatively connected to control terminals of said synchronous two switch forward converter circuit wherein said first single controller monitoring a predefined voltage and simultaneously activating multiple devices within said first synchronous two switch forward converter circuit;
    a second two switch forward converter circuit operatively coupled to the secondary windings; and
    a second controller monitoring the predefined voltage and activating the second two switch forward converter circuit.

4. The circuit arrangement of claim 3 including a high voltage generator for charging the high voltage storage device.

5. The circuit arrangement of claim 3 wherein the high voltage storage device includes a capacitor.

6. The circuit arrangement of claim 3 wherein the first synchronous two switch forward converter circuit includes a first switching device having a first terminal connected to a first end of the primary windings, a first uni-directional conducting device operatively connecting a second end of the primary windings to a second terminal of said first switching device, a second switching device having a first terminal connected to said second end of said primary windings and a second uni-directional conducting device operatively connecting said first end of said primary windings to a second terminal of said second switching device.

7. The circuit arrangement of claim 6 wherein the first switching device and the second switching device include FETs.

8. The circuit arrangement of claim 6 wherein the first uni-directional conducting device and the second unidirectional conducting device include diodes.

9. The circuit arrangement of claim 3 wherein the second two switch converter circuit includes a first switching device operatively connected in series with said secondary windings, a second switching device operatively connected in series with said first switching device, and an inductor connected in series with said second switching device.

10. The circuit arrangement of claim 9 wherein the first switching device and the second switching device include FETs.

11. A circuit arrangement comprising:
    a transformer comprising primary windings and secondary windings;
    a high voltage storage device;
    a first two switch forward converter circuit operatively coupling the high voltage storage device to the primary windings;
    a first controller monitoring a predefined voltage and activating the first two switch forward converter circuit;
    a second two switch forward converter circuit operatively coupled to the secondary windings; and
    a second controller monitoring the predefined voltage and activating the second two switch forward converter circuit wherein the first controller includes a voltage divider circuit that monitors a predefined voltage, a first comparator circuit connected to the voltage divider circuit, a second comparator circuit connected in series with the first comparator circuit, and a pair of driver circuit connected to the second comparator circuit.

12. A circuit arrangement comprising:
    a transformer comprising primary windings and secondary windings;
    a high voltage storage device;
    a first two switch forward converter circuit operatively coupling the high voltage storage device to the primary windings;
    a first controller monitoring a predefined voltage and activating the first two switch forward converter circuit;

a second two switch forward converter circuit operatively coupled to the secondary windings; and a second controller monitoring the predefined voltage and activating the second two switch forward converter circuit wherein the second controller includes a comparator circuit, an inverter circuit connected to an output of the comparator circuit, a first AND gate connected to inverter circuit, and a second AND gate connected to the comparator circuit.

13. The circuit arrangement of claim 3 further including an output capacitor operatively coupled to the secondary windings wherein a voltage provided at the output capacitor is smoothed and held-up for a predetermined time interval by said circuit arrangement.

14. The circuit arrangement of claim 1 wherein the high voltage generator includes a switching device including a gate electrode and a pair of output terminals; circuits that generate pulse width modulated signals operatively connected to the gate electrode; a diode operatively connected to one of the pair of output terminals; and an inductor operatively connected to the diode and the one of the pair of output terminals.

15. The circuit arrangement of claim 14 wherein the switching device includes a FET.

16. The circuit arrangement of claim 14 wherein the pulse width modulation circuits include a controller that generates an error signal based upon a set of predefined signals and a comparator having an output connected to the gate electrode and one input connected to an output of the controller.

17. The circuit arrangement of claim 16 wherein the set of predefined signals includes a first signal generated by a voltage divider circuit operatively connected to an output port of said circuit arrangement, a second signal generated by a voltage divider circuit operatively connected to an input port of said circuit arrangement, and a third signal generated by a reference voltage generator.

18. The circuit arrangement of claim 3 wherein the first single controller includes a first comparator circuit, a circuit for mirroring a predefined voltage operatively connected to a first terminal of said first comparator circuit, a reference voltage operatively connected to a second terminal of said first comparator, a second comparator circuit operatively connected to an output of said first comparator circuit, and a saw tooth voltage operatively connected to an input terminal of the second comparator circuit.

19. The circuit arrangement of claim 18 wherein the circuit for mirroring the predefined voltage includes a pair of resistors connected in series.

20. The circuit arrangement of claim 18 further including a pair of driver circuits operatively connected to an output of said second comparator circuit.

* * * * *